United States Patent [19]

Lytaev et al.

[11] 4,435,748
[45] Mar. 6, 1984

[54] METHOD OF PULSED CONTROL OF HIGH-TENSION THYRISTOR RECTIFYING ARRANGEMENT AND SYSTEM FOR EFFECTING SAME

[75] Inventors: Rem A. Lytaev; Khristofor F. Barakaev; Igor P. Taratuta; Sergei V. Krainov, all of Moscow, U.S.S.R.

[73] Assignee: Vsesojuzny Elektrotekhnickesky Institut Imeni V.I. Lenina, Moscow, U.S.S.R.

[21] Appl. No.: 375,717

[22] Filed: May 7, 1982

[51] Int. Cl.³ .............................................. H02M 1/08
[52] U.S. Cl. ................. 363/54; 307/252 Q; 363/68; 363/87
[58] Field of Search ............... 363/54, 68, 87, 129; 307/252 N, 252 Q

[56] References Cited

U.S. PATENT DOCUMENTS

| 3,715,606 | 2/1973 | Travin et al. | 307/252 Q |
| 3,728,557 | 4/1973 | Pelly et al. | 307/252 N |
| 4,223,236 | 9/1980 | Iyotani et al. | 363/68 |
| 4,313,156 | 1/1982 | Kobayashi et al. | 363/54 |

FOREIGN PATENT DOCUMENTS

| 54-18663 | 2/1979 | Japan | 363/68 |
| 54-45562 | 4/1979 | Japan | 307/252 N |
| 56-53572 | 5/1981 | Japan | 363/68 |
| 304893 | 3/1973 | U.S.S.R. | |
| 292590 | 3/1973 | U.S.S.R. | |

Primary Examiner—William H. Beha, Jr.
Attorney, Agent, or Firm—Lilling and Greenspan

[57] ABSTRACT

The proposed method provides that a narrow control pulse is applied to the thyristors of the arrangement at the beginning of the conduction interval of the arrangement. The positive voltage across the monitored thyristors is measured and a monitor signal is formed at the point in time when the voltage reaches a preset level. Using the received monitor signals, one can count the number of the thyristors whose positive voltage exceeds a preset level. At the point in time when the number of the monitor signals reaches a preset value, additional narrow control pulses are applied to the thyristors.

The proposed control system comprises devices for measuring the positive voltage across the monitored thyristors and an adder connected to the devices. The adder and a reference signal source are coupled to a comparison circuit which, like a sync pulse source, is connected to an AND gate. The AND gate and the sync pulse source are connected to an OR gate which couples an amplifier-former connected to the arrangement. The present invention provides for improved operational reliability of the arrangement.

4 Claims, 5 Drawing Figures

METHOD OF PULSED CONTROL OF HIGH-TENSION THYRISTOR RECTIFYING ARRANGEMENT AND SYSTEM FOR EFFECTING SAME

FIELD OF THE INVENTION

The invention relates to high-tension converters and, more particularly, to a method of pulsed control of a high-tension rectifying arrangement and a system for effecting same.

BACKGROUND OF THE INVENTION

The invention is applicable to the design and development of high-tension thyristor rectifying circuits.

DESCRIPTION OF THE PRIOR ART

Known in the art is a method of pulsed control of a high-tension thyristor rectifying circuit (cf. the U.S. Pat. No. 3,728,557) comprising the steps of applying a control pulse whose duration is equal to the conduction interval of said circuit and disabling this pulse at the points in time when the positive voltage in the forward direction acquires a value which is less than a given voltage value. According to the method, the voltage across the circuit is monitored by independent measurements performed on the circuit anode and cathode. This control system is somewhat cumbersome, especially in the case when the circuit is used as part of a controlled bridge converter. As a result, sophisticated thyristor rectifying circuits are provided by the method.

There is another method of pulsed control of a high-tension thyristor rectifying circuit (cf. the Swedish Pat. No. 364,412), comprising the steps of applying a wide control pulse to all thyristors during the conduction interval of the circuit, measuring the level of positive voltage in the forward direction on all thyristors and disabling this pulse during the time intervals lasting from the point in time when the positive voltage in the forward direction, as measured on all thyristors, is below a preset level to the point in time when said level is exceeded on one of the thyristors. Under these circumstances, all devices incorporated in the control system effecting the described method, including apparatus providing for the transmission and reception of data on the values of the voltages across the thyristors, and also the devices forming control pulses applied to the thyristors, should be able to handle continuous signals. Note that the control section of the system must be given a considerable degree of sophistication; in particular, the employment of a light-pulse control system requires continuously operated light-emitting sources. Moreover, the described method fails to provide a control system with adequate reliability, since the system can be operated normally only when all channels transmitting data on thyristor voltages are servicable. If any device belonging to these channels is found to be at fault, normal operation of the control system and also of the rectifying circuit as a whole is disturbed; this may cause, for instance, a situation in which a continuous control signal is generated or a control signal is applied to the thyristors maintained at a negative potential.

There is yet another method of pulsed control of a high-tension thyristor rectifying circuit (cf. the USSR Inventor's Certificate No. 304,893, cl.H02 P3/16, 1967) operated as part of an n-phase converter. The method comprises the steps of applying to all thyristors of the circuit a narrow control pulse at the beginning of the conduction interval, measuring during the conduction interval the level of positive voltage across the circuit in the forward direction, determining the point in time when the circuit voltage goes through zero from a positive to a negative value, and applying, at this point, additional narrow control pulses to all circuit thyristors. In a system effecting the method, the voltage across the circuit is measured by means of grounded measuring voltage dividers having their second terminals connected to the circuit anode and cathode or with the help of a measuring voltage divider connected to the circuit anode and cathode. If a fault occurs in any of the voltage dividers, the operation of the control system and the circuit as a whole is disturbed. Duplication of the measuring voltage dividers makes the circuit more complex, since they are implemented in the form of independent high-tension devices. This leads to an increase in the area occupied by the equipment of the conversion substation. Moreover, a high-tension measuring voltage divider must have a comparatively low impedance, since its operation is influenced by a high level of interference from the substation equipment. As a result, extra heat loss takes place and heat sinks are required for the removal of the heat. The presence of a high-tension measuring voltage divider in the circuit results in the appearance of overvoltages therein. During transients, for instance, in the cases when the circuit is turned on or its blocking capability is restored, there results a marked unevenness concerning the division of the voltage among the individual thyristors or thyristor groups. Under these circumstances, internal overvoltages might appear in the circuit, between the elements of the divider, which is part of the circuit, and the elements of the circuit and of the power equipment, since the divider is electrically connected to the circuit only at the anode and cathode points. Thus the insulation inside the circuit should meet stringent requirements.

When a high-tension thyristor rectifying circuit comprises series connected chokes, the voltage that exists on the circuit during transients considerably differs from the sum voltage on all thyristors. As a result, the circuit voltage may go through zero even in the case when the circuit is already made conductive. Such extra zero transfers occur after the circuit turning on as well as during the conduction interval in turning on the other rectifying circuits incorporated in the converter which is operated in conjunction with the described circuit. When the rectifying circuits are turned on, transients result in the converter, which leads to the appearance of r.f. components of the current flowing through the turned on circuit under consideration. As a result, r.f. components are induced in the voltages across the chokes and the circuit as a whole.

The additional zero transfers of the voltage across the circuit appear during the conduction interval and additional narrow control pulses should be applied to all thyristors of the circuit in accordance with the method described. However, since the circuit is conductive no additional narrow control pulses are to be applied, and they should be disabled under these conditions in order to resist untimely wear of the elements of the control system of the circuit.

There is a system of pulsed control of a high-tension thyristor rectifying circuit operated as part of an n-phase converter and including a number of series connected thyristors and a circuit generating narrow control pulses applied to all thyristors of the rectifying circuit (cf. the USSR Inventor's Certificate No. 292,590). The described control system comprises a sync pulse source which forms a narrow pulse at the beginning of the conduction interval of the circuit and a wide pulse whose length corresponds to said conduction interval. The sync pulse source has its output at which said wide pulse appears connected to an AND gate, and has its output at which said narrow pulse appears connected to an OR gate. The output of the OR gate connects an amplifier-former which forms pulses to simultaneously turn on all thyristors of the rectifying circuit and which has its output connected to the narrow control pulse generating circuit. The described control system also comprises a means for measuring the voltage across the rectifying circuit, which means includes a high-tension voltage divider connected to the external terminals of the rectifying circuit, a voltage transmitter connected to the low-voltage arm of the voltage divider, said voltage transmitter being adapted to generate a preset-length pulse at the moment when the positive voltage in the conducting direction exceeds a given voltage level. The voltage transmitter connects a receiver whose output is coupled to an input of an AND gate.

The described control system makes it possible to apply narrow control pulses to all thyristors of the rectifying circuit at the point in time when the current conduction interval of the circuit commences and also at any moment within said interval, provided that the voltage across the circuit is positive.

A failure or false operation of any one of the units of the voltage measuring means inevitably leads to a disturbance of the normal operation of the contol system as a whole. The duplication of the voltage measuring means makes the construction of the rectifying circuit substantially complex, since the number of high-tension voltage dividers is increased, each of such dividers being implemented as an independent high-tension device.

The high-tension voltage divider belonging to the described control system must have a comparatively low impedance in order to provide for adequate accuracy of voltage monitoring under conditions in which a high level of interference from the converter substation is present.

The use of a high-tension voltage divider with the rectifying circuit requires a more reliable insulation. This is due to the fact that an unevenness of dividing the voltage among thyristors of groups thereof during transients might result in a condition in which overvoltages appear between the elements of the divider and of the rectifying circuit. The duplication of the voltage dividers which are part of the rectifying circuit makes the latter more and more complex.

When a high-tension thyristor rectifying circuit comprises chokes series connected to the thyristors, the control system described features poor operational reliability. This is connected with the fact that the voltage drop on the rectifying circuit in the conductive state is determined in this case by the sum of the direct voltage drops on the thyristors and the sum of the voltage drops on the chokes. When the rectifying circuits are turned on and off, transients develop in the n-phase converter which lead to the appearance of r.f. components in the current flowing through the turned-on rectifying circuit.

These r.f. current components result in the appearance of r.f. voltage components on the chokes which are maintained at a level allowing for normal operation of the devices that monitor positive voltage across the circuit in conducting direction. If the output signals of these devices are formed during the circuit conduction interval, then the described control system enables the application of narrow control pulses to all thyristors of the circuit.

Since the additional narrow control pulses can be applied in normal operating conditions, it results in accelerated wear of the control devices while the devices forming control pulses applied to the thyristors consume more power.

SUMMARY OF THE INVENTION

An object of the present invention is to provide for an increased operational reliability of a high-tension thyristor rectifying arrangement.

This and other objects are attained by a method of pulsed control of a high-tension thyristor rectifying arrangement working as part of an n-phase converter, comprising the steps of applying narrow control pulses to all thyristors incorporated in the arrangement at the beginning of its conduction interval, measuring the value of a positive voltage across the arrangement in the forward direction and applying additional narrow control pulses to the thyristors during said conduction interval. According to the invention, the value of the positive voltage across the arrangement is monitored by measuring positive voltage signals across each of the monitored thyristors or each monitored group thereof; a given number of said thyristors or said thyristor groups is chosen; monitor signals are formed at the points in time when the values of the positive voltage signals across the controlled thyristors or the groups thereof exceed the preset voltage level; and the number of the monitor signals is counted. The additional narrow control pulses are applied to all thyristors of the arrangement at the moment in time when the number of the monitor signals reaches the preset number.

Preferably, in a high-tension thyristor rectifying circuit including chokes series connected to the thyristors and working as part of an n-phase converter, the additional narrow control pulses should be applied to all thyristors when the value of the current flowing through the n-phase converter is less than the preset current value.

This and other objects are also attained by a system for pulsed control of a high-tension thyristor rectifying arrangement, working as part of an n-phase converter and including a number of series thyristors and a circuit generating narrow control pulses applied to each of said thyristors, which control system comprises a sync pulse source generating a narrow pulse at the beginning of the arrangement conduction interval and a wide pulse whose length corresponds to the arrangement conduction interval; an AND gate connected to the output of the sync pulse source at which said wide pulse appears; an OR gate connected to the output of the sync pulse source at which said narrow pulse appears and to the output of the AND gate; and an amplifier-former that forms pulses to simultaneously turn on all thyristors of the arrangement, and has its input coupled to the output of the OR gate and having its output connected to said narrow control pulse generating circuit. The device also comprises a means for measuring the value of the voltage across the arrangement, said means being electrically connected to the arrangement. According to the invention, the arrangement voltage measuring means comprises devices for measuring the voltages across the monitored thyristors or the monitored groups thereof, the devices being equal in number to the given number of the monitored thyristors or the monitored groups thereof, each of said devices being connected to the respective monitored thyristor or to the respective monitored group thereof and adapted to form a monitor signal at the point in time when the value of a positive voltage signal, as measured on each of the monitored thyristors or each of the monitored group thereof, exceeds the preset voltage level. Said arrangement voltage measuring means also comprises an adder which connects the outputs of the voltage measuring devices and forms a signal carrying information about the number of the received monitor signals, a reference signal source producing a reference signal characteristic of the given number of the monitor signals; and a comparison circuit adapted to compare the output signals of the adder and of the reference signal source, being connected to an input of the AND gate, and forming a narrow pulse at the point in time when the output signals of the adder and the reference signals source are of the same value.

Preferably, in the case of a high-tension thyristor rectifying arrangement including chokes series connected with the thyristors, the control system should be provided with a device for measuring the value of the current flowing through an n-phase converter, which device should have its output connected to a respective input of an AND gate.

BRIEF DESCRIPTION OF THE DRAWINGS

The present invention will now be described in more detail by way of examples in accordance with the accompanying drawings in which.

DETAILED DESCRIPTION OF THE INVENTION

Figure 1:
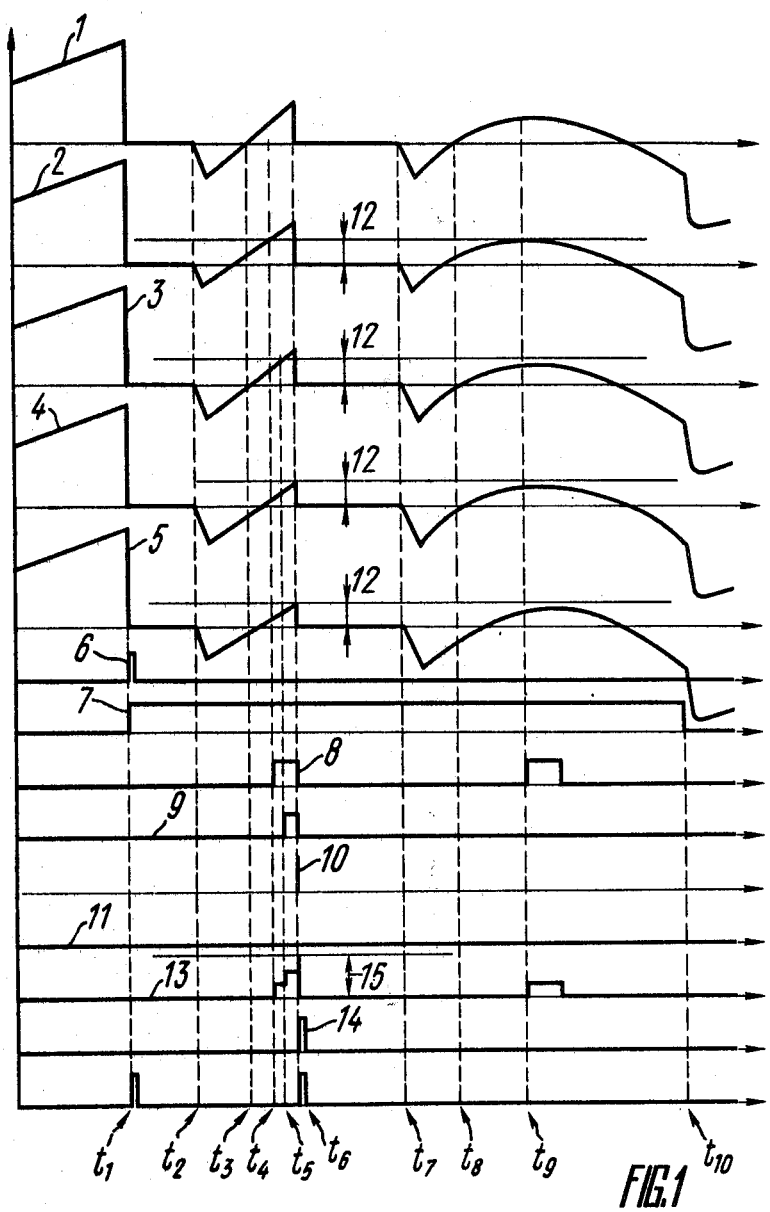
FIG. 1 shows time diagrams depicting the processes that take place in a high-tension thyristor rectifying arrangement to which control pulses are applied by following the steps of the proposed method, according to the invention.

The proposed method of pulsed control of a high-tension thyristor rectifying arrangement working as part of an n-phase converter consists in that at the beginning of the conduction interval a narrow control pulse is applied to each of the thyristors incorporated in the arrangement, whose length is selected on the basis as follows: it must exceed the time during which the thyristors are to be turned on; and it must be considerably lower than the arrangement conduction interval and equal, for instance, to a value not exceeding two electrical degrees. The length of the conduction interval is determined by the converter control and protection system and is equal, in the case of a three-phase bridge circuit, to 120 electrical degrees. The next step, according to the proposed method, involves the measurement of the value of a positive voltage in the forward direction on each monitored thyristor or each monitored group of the thyristors. This action is performed by forming a monitor signal at the point in time when the value of the positive voltage across the monitored thyristor or the monitored group of thyristors in the forward direction exceeds the preset voltage level. It is essential that the monitor signals from each of the monitored thyristors or each monitored group thereof are formed independently of one another. Thus the number of the monitor signals is equal to the number of the monitored thyristors or to the number of the monitored groups of thyristors. The preset level of the positive voltage in the forward direction considerably exceeds the sum of voltage drops on the thyristors included in the controlled group or in the arrangement, this holds for all modes of operation. When the preset level is exceeded, this means that the thyristors belonging to the controlled group or to the arrangement, or the controlled thyristor alone, are disabled in the forward direction. The number of the monitored thyristors or the monitored groups of thyristors is selected on the basis as follows. Firstly, the voltage across the thyristors or thyristor groups available in a given number must depict with adequate accuracy the voltage across the arrangement as a whole. Secondly, the selected number above must provide for reliable monitoring of the arrangement voltage should false signals, interference or a failure in the control system occur. Thirdly, the number of the monitored thyristor groups may be determined from the characteristics of the other systems of the arrangement such as the serviceability check or the protection system. According to the third condition stated, it is standard practice to monitor the voltage on all thyristors incorporated in the arrangement, which are either combined together in groups or treated as independent elements.

There is yet another step, according to the proposed method, in which the number of the monitor signals is counted which corresponds to the number of the thyristors or thyristor groups whose positive voltage in the forward direction exceeds the preset voltage level. At the point in time when the number of the monitor signals reaches the preset number, provided that this moment is within the conduction interval, all arrangement thyristors receive an additional control pulse whose length is determined by the same conditions as in the case of the control pulse applied at the beginning of the conduction interval. The preset number equal to the number of the monitor signals should satisfy the following conditions. Firstly, the number of the monitor signals must represent fairly well the fact that a positive voltage across the arrangement is present. Secondly, this number should be related to the spread in the characteristics of the thyristors incorporated in the arrangement, for instance, to the spread in the recovery charges. With the arrangement turned on, the spread in the recovery charges results in a condition in which the voltage is divided among the thyristors or thyristor groups in uneven fashion, this unevenness being maintained during the time interval approximately equal to the frequency oscillation cycle of the mains voltage. At the moment when the voltage across the arrangement transfers through zero, there appear on some thyristors or thyristor groups substantially differing voltages due to said unevenness of voltage division. Under these circumstances, some of these divided voltages may be either positive or negative, or close to zero. Correspondingly, there may be substantially differing points in time when the positive voltage in the forward direction, as measured on some thyristors or thyristor groups, exceed the preset voltage level. The thyristors or thyristor groups, having the greatest recovery charge during turn-off, produce first the signals carrying information about an excess over the preset voltage level. On the other hand, the voltage in the forward direction existing on the thyristors having the smallest recovery charge is maintained at a minimum or close to zero, or becomes negative. Thus an additional narrow control pulse is applied only on arrival of a sufficient number of the monitor signals, namely, that number at which one is fully confident that there is a positive voltage across all thyristors. The precise value of the number of monitor signals whose appearance causes the application of an additional control pulse is determined from the statistical spread in the thyristor characteristics and, first of all, from the spread in their recovery charges.

When the proposed method is used to handle a high-tension thyristor rectifying arrangement including chokes series connected to the thyristors, the use of the additional control pulses is related to the value of the current flowing through the converter. This is caused by the fact that during normal operation of the arrangement, when it is turned on and has a current flowing through it, there might develop a fluctuation of the voltage existing on the thyristor groups having series connected chokes. These voltage fluctuations result from r.f. components present in the arrangement current due to transients occurring in the converter during turn-on of the other rectifying circuits of the converter. Therefore during normal operating conditions and also in the case when the current through the converter exceeds the peak amplitude of its r.f. components, no additional control pulses are applied, since the arrangement is conducting. The disabling of additional control pulses resists untimely wear of the elements of the control system.

Given below is an example illustrating the operation of an n-phase converter through which intermittent currents flow, in accordance with the proposed method. Such operating conditions take place, for instance, during turn-on and turn-off of the converter with the rectifier maintained in no-load condition. FIG. 1 shows time diagrams depicting the operating conditions of the converter just described. In the figure, signal 1 represents the voltage waveform for a high-tension thyristor rectifying arrangements; Signals 2, 3, 4 and 5 show the voltage waveforms for four monitored thyristors or four monitored thyristor groups taken from the thyristors incorporated in the arrangement. For the sake of simplicity, no voltage waveforms for the remaining controlled thyristors or thyristor groups are shown, and the measured value of the positive voltage in the forward direction for every individual thyristor will be treated in what follows by using the waveforms represented by the signals 2, 3, 4 and 5; Signal 6 shows a narrow control pulse applied to the thyristors of the arrangement at the beginning of the conduction interval; Signal 7 shows a wide pulse whose length is equal to the arrangement conduction interval; Signals 8, 9, 10 and 11 represent the monitor signals formed at the point in time when the positive voltage in the forward direction, as measured on the monitored thyristors, exceeds the preset level 12; signal 13 carries data on the number of the thyristors whose positive voltage in the forward direction exceeds the preset level 12; and signal 14 shows an additional control pulse applied to the arrangement thyristors at the point in time when the level of the signal 13 reaches the preset value 15, corresponding, for instance, to three monitor signals.

At time $t_1$ (the beginning of the conduction interval) the arrangement thyristors receive a narrow control pulse (signal 6). The thyristors are rendered conductive, and the voltages across them (signals 2, 3, 4 and 5) and also across the arrangement itself (signal 1) are reduced down to a level determined by the voltage drop on the conducting thyristor. A current begins to flow through the thyristors which is stopped at time $t_2$. With the thyristors turned off, the voltage is allocated among them in uneven fashion since their recovery charges are different. This unevenness is maintained until time $t_3$ is reached when the positive voltage in the forward direction appears on the arrangement once again. In this condition, there results a shift of the points in time when the positive voltage across the thyristors exceed the preset level 12 (signals 8, 9, 10 and 11). At time $t_4$ signal 8 appears first which carries data on a condition in which the positive voltage on the first thyristor exceeds said level. After that, there appear signals 9 and 10 corresponding to time $t_5$ and $t_6$ at which the preset level is exceeded on the succeeding thyristors being monitored. At time $t_6$, when the number of the counted monitor signals reaches the preset value 15, and additional control pulse (signal 14) is formed which is applied to the thyristors of the arrangement. Under these circumstances, the voltage across the fourth thyristor (signal 5) fails to reach the preset level 12 and monitor signal 11 is not present. Further, until time $t_7$ is reached, the arrangement is rendered conductive again and the following appearance of the positive voltage on the arrangement at time $t_8$ (signal 1) deals with an unevenness with which the voltage is allocated among the thyristors.

With the voltage across the arrangement varying in a manner just described, there is only one thyristor at which the voltage exceeds the preset level 12, and the formation of the monitor signal 8 at time $t_9$ is the result. The monitor signals from the remaining thyristors under monitoring are not formed since their positive voltages are too small; thus no additional control pulse 14 is applied.

Figure 2:
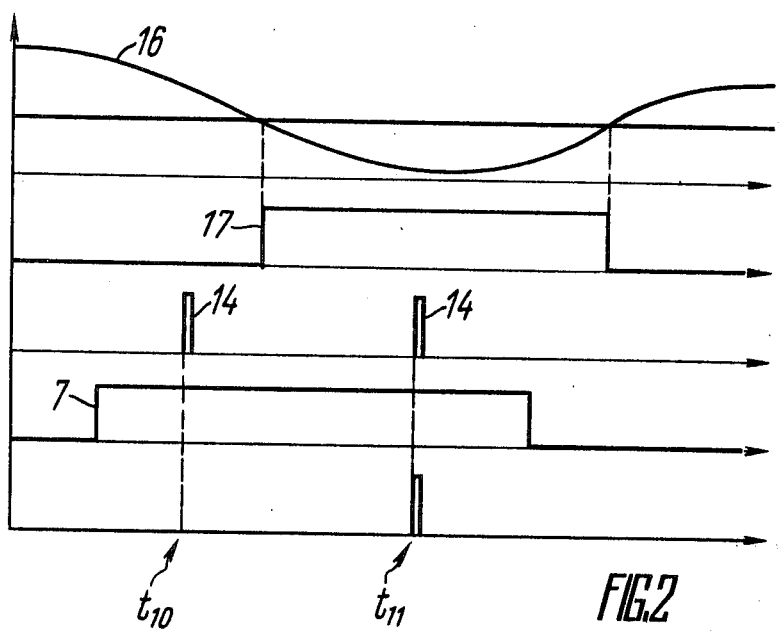
FIG. 2 shows time diagrams depicting the processes that take place in a high-tension thyristor rectifying arrangement including chokes series connected to the thyristors to which control pulses are applied by following the steps of the proposed method, according to the invention.

The time diagrams of FIG. 2 explain the case when the proposed method deals with a high-tension thyristor rectifying arrangement including chokes series connected to the thyristors. Consider now the converter in which the current is reduced below the preset level and may be interrupted, along with the current flowing through the arrangement, due to the transients occuring as a result of turn-on of the other rectifying circuits included in the converter. Signal 16 shows the waveform of the converter current. A logic signal 17 is formed during the time intervals in which the value of the converter current becomes either greater or lower than the preset current level. At time $t_{10}$ no additional control pulse is applied since the value of the converter current exceeds the preset current level. Said pulse is applied only at time $t_{11}$ when the converter current is reduced below the preset level and the arrangement may be turned off, for instance, due to turn-on of another rectifying arrangement of the converter, which requires that an additional control pulse be applied.

It is seen therefore that the proposed method provides for adequate accuracy of monitoring the positive voltage in the forward direction across the thyristor rectifying arrangement, since the monitoring process is accomplished by measuring the value of this positive voltage on an excessive number of thyristors or thyristor groups. Moreover, the additional narrow control pulses are applied according to the proposed method only when the number of the monitor signals, formed at the points in time when the value of the positive voltage in the forward direction across the monitored thyristors or thyristor groups exceeds the preset voltage level, reaches the given number. This allows for the application of the additional control pulses to each of the arrangement thyristors. As a result, they are turned on reliably only when a positive voltage exists on them. Thus the arrangement features higher operational reliability since a false operation of or a failure in some devices that measure voltage on the monitored thyristors or thyristor groups does not disturb the normal operation of the control system and the arrangement as a whole.

In the case when the arrangement includes series connected chokes, the proposed method makes it possible to disable the application of additional control pulses when the converter current is maintained at a level which eliminates the possibility of the arrangement turn-off during the conduction interval, with the result that the additional control pulses are not required in this case.

In accordance with the invention there is provided a control system to carry out the proposed method of pulsed control of a high-tension thyristor rectifying arrangement 18 (FIG. 3) including a number of series thyristors 19 and a circuit 20 implemented, for instance, as a light-pulse circuit and adapted to apply narrow control pulses to the thyristors 19. The circuit 20 comprises a distributor 21 and control pulse formers 22 adapted to turn on the thyristors 19. The proposed control system comprises a sync pulse source 23, an AND gate 24 connected to one output of the source 23, and an OR gate 25 connected to the other output of the source 23 and to the output of the AND gate 24. Connected to the output of the OR gate 25 is an amplifier-former 26, including a semiconductor laser 28, whose output is coupled to the distributor 21.

Figure 4:
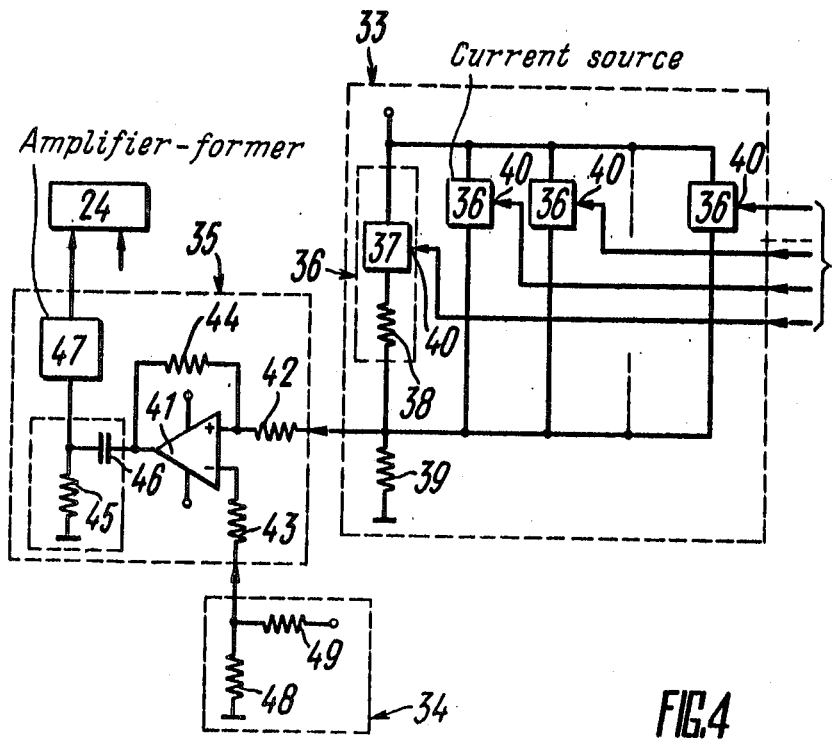
FIG. 4 is a block diagram of a means for measuring the value of the voltage across the arrangement, according to the invention.

The proposed control system also comprises a means for measuring the voltage across the arrangement 18, said means includes devices 29 adapted to measure the voltage across the monitored thyristors 19 or the monitored groups thereof. The number of the devices 29 is equal to the number of the monitored thyristors 19 or the monitored groups thereof. Each of the devices 29 comprises a series connection of a voltage transmitter 30 connected to a respective thyristor 19 or a respective group of thyristors 19 under monitoring, a data transmitting channel 31, and a receiver 32. The outputs of the receivers 32 are the outputs of the devices 29 and are connected to an adder 33. The adder 33 and a reference signal source 34 are connected to a comparison circuit 35 which is adapted to compare their output signals and is coupled to the AND gate 24. The adder 33 (FIG. 4) comprises controlled current sources 36 which are each implemented as a series connection of a controlled switch 37 and a high-impedance resistor 39. Inputs 40 of the controlled current sources 36 serve as the inputs of the adder 33.

The comparison circuit 35 can be implemented as a series connection including a Schmitt trigger which comprises an operational amplifier 41 with input resistors 42 and 43 and a positive feedback resistor 44, a differentiating circuit including a resistor 45 and a capacitor 46, and an amplifier-former 47.

The reference signal source 34 may be implemented as a voltage divider using resistors 48 and 49 and connected to a d.c. source.

Figure 5:
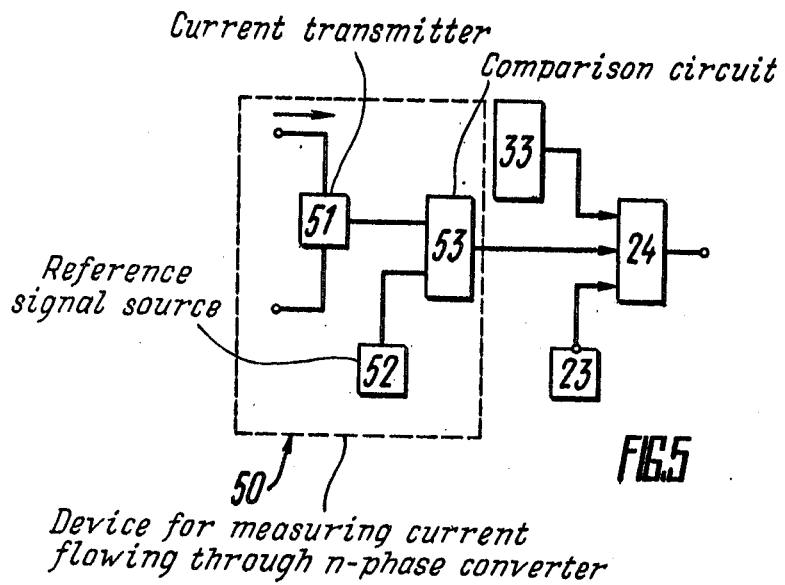
FIG. 5 is a block diagram of a system for pulsed control of a high-tension thyristor rectifying arrangement including chokes series connected to the thyristors, according to the invention.

In the case of a high-tension thyristor rectifying arrangement includes chokes series connected to the thyristors, the proposed control system comprises a device 50 (FIG. 5) adapted to measure the current flowing through an n-phase converter, which device 50 comprises a converter current transmitter 51 and a reference signal source 52 connected to a comparison circuit 53 adapted to compare their output signals. The comparison circuit 53 is connected to the AND gate 24.

Given below is the description of the operation of the proposed control system associated with transient conditions occurring in an n-phase converter in which case intermittent currents are present. At time $t_1$ (FIG. 1) corresponding to the beginning of the conduction interval, a narrow pulse (signal 6) formed by the sync pulse source 23 (FIG. 3) passes through the OR gate 25 and is applied to the input of the amplifier 27. This triggers the laser 28. A light pulse produced by the laser 28 is handled by the circuit 20 and is allocated among the control pulse formers 22. As a result, the thyristors 19 are turned on. During time $t_1$ to $t_2$ (FIG. 1) the arrangement 18 (FIG. 3) is rendered conductive. At time $t_2$ (FIG. 1) when the thyristors 19 (FIG. 3) are turned off, the arrangement 18 acquires a condition in which the voltage is allocated among the thyristors 19 in uneven fashion due to the spread in their recovery charges. This unevenness is maintained until time $t_3$ (FIG. 1) is reached when a positive voltage appears on the arrangement 18 (FIG. 3), and leads to a shift of the points in time when the positive voltage across the monitored thyristors 19 exceeds the preset voltage level. Correspondingly, the monitor signals 8, 9, 10 and 11 (FIG. 1) are formed by the respective transmitters 30 (FIG. 3) at different times. Passing through the channels 31, the monitor signals 8, 9, 10 and 11 (FIG. 1) are applied to the input of the receiver 32 (FIG. 3) and activate the respective controlled current sources 36 (FIG. 4) of the adder 33. The latter forms the signal 13 (FIG. 1) which carries data on the number of the sources 36 (FIG. 4) activated concurrently. Thus the voltage at the output of the adder 33 represents the number of the monitored thyristors 19 (FIG. 3) or the monitored groups including thyristors 19 whose positive voltage exceeds the preset voltage level. When the voltage across the adder 33 (FIG. 4) represented by the signal 13 in FIG. 1 reaches the preset level 15 (FIG. 1) equal to the voltage across the reference signal source 34 (FIG. 4), the Schmitt trigger of the comparison circuit 35 goes from 0 to 1 and is kept in this state until the output voltage of the adder 33 is reduced down to the preset level. Using the differentiating circuit and the amplifier-former 47, the length of the pulse at the output of the Schmitt trigger is reduced down to the preset value. Since time $t_6$ is within the conduction interval of the arrangement 18 (FIG. 3), the AND gate 24 (FIG. 3) is rendered conductive and passes the signal from the output of the comparison circuit 35 to the OR gate 25. As a result, the amplifier-former 26 is triggered and the thyristors 19 of the arrangement 18 are turned on.

Figure 3:
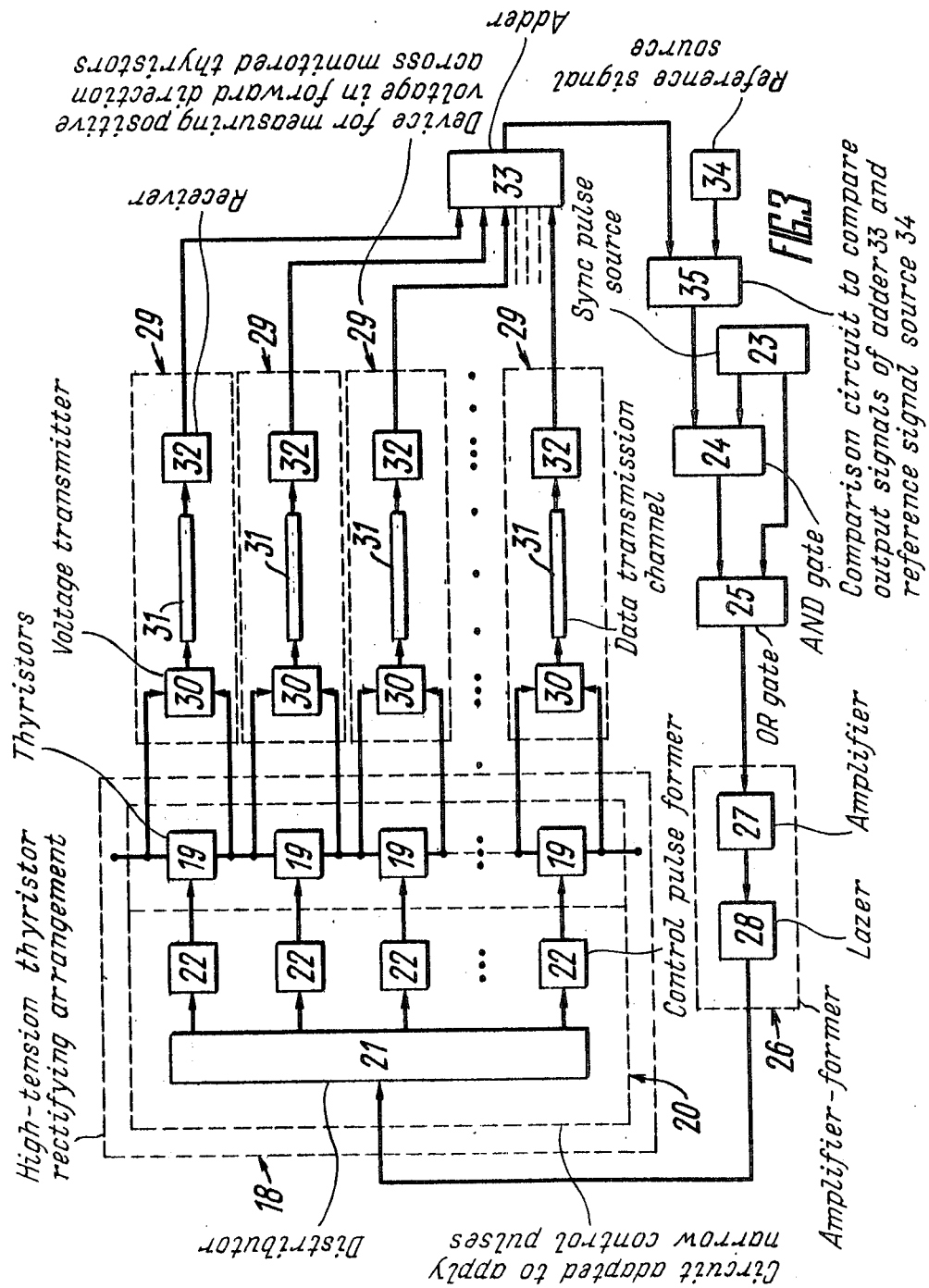
FIG. 3 is a block diagram of a system for pulsed control of a high-tension thyristor rectifying arrangement, according to the invention.

With the arrangement 18 turned on, the level of the positive voltage in the forward direction across the thyristors 19 is reduced down to the voltage drop level. As a result, no signals are applied to the inputs of the transmitters 30 (FIG. 3), the current sources 36 (FIG. 4) are blocked, the voltage across the output of the adder 33 is reduced down to zero, and the Schmitt trigger assume 0 state. After the elapse of time $t_6$ to $t_7$ (FIG. 1) and the reverse voltage interval ending at $t_8$, a positive voltage appears again on the arrangement 18. However, its level is insignificant and the monitor signal carrying data on the fact that the preset voltage level is exceeded is formed at time $t_9$ (FIG. 1) by one transmitter 30 only (FIG. 3). The output signal of the adder 33 fails to reach the preset level, the Schmitt trigger does not change its state and, in spite of the fact that $t_8$ (FIG. 1) is within the conduction interval of the arrangement 18 (FIG. 3), the narrow control pulses 14 (FIG. 1) intended to turn on the thyristors 19 of the arrangement 18 are not formed. Note that the duration of the output signal of the transmitter 30 may be at a maximum and equal to the preset value.

At time $t_{10}$ (FIG. 1) the conduction interval of the arrangement 18 (FIG. 3) ceases and the AND gate 24 is blocked.

When the arrangement 18 comprises chokes series connected to the thyristors 19, the proposed control system operates as follows. The current transmitter 51 (FIG. 5) senses the current flowing through an n-phase converter and generates a signal proportional to the value of the current being monitored. The output signal of the reference signal source 52 corresponds to the preset level of the converter current. This level exceeds the peak amplitude of r.f. components of the converter current. The comparison circuit 53 generates a logic 0 signal in the case when the output signal of the transmitter 51 is less than the output signal of the source 52. If the current flowing through the n-phase converter exceeds the preset values, then the output signal of the comparison circuit 53 (logic 0) blocks the AND gate 24 (FIG. 3) and resists the application of the pulses 14 (FIG. 1) to the thyristors 19 (FIG. 3).

The proposed control system comprises an additional number of groups of the voltage measuring devices 29 (FIG. 3) which operate independently of one another. This provides for adequate determination of the point in time when a positive voltage appears on the arrangement 18 under conditions in which some groups of the devices 29 are at fault or subject to false operation.

In addition, the proposed system comprises the adder 33 having its inputs equal in number to the devices 29. This ensures rapid handling of the signals produced by the devices 29 along with adequate reliability.

The proposed system is advantageous in that is comprises the comparison circuit 35 adapted to compare the output signals of the adder 33 and the reference signal source 34. The comparison circuit 35 generates a narrow pulse only when these output signals are of the same value. This ensures adequate determination of the point in time when the additional control pulse 14 (FIG. 1) is to be applied under conditions in which some elements of the adder 33 or of the devices 29 are at fault or subject to false operation.

If the arrangements 18 comprise additional series connected chokes, the proposed control system ensures disabling the additional narrow control pulses 14 (FIG. 1) at the points in time when the current through an n-phase converter exceeds the peak amplitude of r.f. current components. In this case, the arrangement 18 cannot be turned off normally during the conduction interval and no additional narrow control pulse 14 is required. Thus the proposed system protects its components, in particular, the laser 28 (FIG. 3) from untimely wear and does not allow the formers 22 providing for the desired parameters of the pulses which turn on the thyristors 19 to ineffectively consume their own power.

What is claimed is:

1. A method of pulsed control of a high-tension rectifying arrangement including thyristors and working as part of an n-phase converter, comprising the steps as follows:
    a. applying at the beginning of the conduction interval of said arrangement a narrow pulse to said thyristors of said arrangement;
    b. selecting a given number of monitored thyristors from said thyristors of said arrangement to measure on them the value of positive voltage in the forward direction or selecting a given number of monitored thyristor groups from said thyristors of said arrangement to measure on them the value of positive voltage in the forward direction;
    c. selecting a preset level exceeded by said value of positive voltage in the forward direction on said monitored thyristors or said monitored thyristor groups;
    d. determining the points in time when said value of positive voltage in the forward direction on each of said monitored thyristors or on each of said monitored thyristor groups exceeds said preset level;
    e. forming monitor signals at said points in time;
    f. counting the number of said monitoring signals and selecting a given number of said monitor signals; and
    g. applying additional narrow control pulses to said thyristors of said arrangement at the point in time when said number of said monitor signals reaches said given number.

2. A method of pulsed control of a high-tension rectifying arrangement including thyristors and working as part of an n-phase converter as claimed in claim 1, wherein the following steps are provided:
    a. monitoring the value of current flowing through said n-phase converter;
    b. selecting a preset level of said value of current flowing through said n-phase converter; and
    c. applying narrow additional control pulses to said thyristors of said arrangement when said value of current flowing through said n-phase converter is less than said preset level.

3. A system of pulsed control of a high-tension rectifying arrangement working as part of an n-phase converter and including serial thyristors, some of said thyristors are used as monitored thyristors or combined to form monitored thyristor groups so that the value of positive voltage in the forward direction is measured on them, and a circuit to apply narrow control pulses to each of said thyristors of said arrangement, comprising;
    a. a means for measuring the value of positive voltage in the forward direction on said arrangement, which means has an output;
    b. devices for measuring said value of positive voltage in the forward direction on said monitored thyristors or said monitored thyristor groups, belonging to said voltage measuring means, said devices being connected to respective ones of said monitored thyristor groups and forming monitor signals at the point in time when said value of positive voltage in the forward direction on each of said monitored thyristors or on each of said monitored thyristor groups exceeds a preset level, said devices having each an output;

c. an adder of said voltage measuring means connected to said output of said voltage measuring devices and forming a signal that carries data on the number of the received signals among said monitor signals, said adder having an output;

d. a reference signal source of said voltage measuring means forming an output signal representative of a given number of said monitor signals, said reference signal source having an output;

e. a comparison circuit comparing said output signals of said adder and said reference signal source and to form a narrow pulse at the point in time when said output signals of said adder and said reference signal source are of the same value, an output of said comparison circuit being used as said output of said voltage measuring means;

f. an AND gate having first and second inputs and an output, said first input being coupled to said output of said comparison circuit;

g. and a sync pulse source having a first output coupled to said second input of said AND gate, a second output and forming at its first output a wide pulse whose length corresponds to the conduction interval of said arrangement and forming at its second output a narrow pulse at the beginning of the conduction interval of said arrangement;

h. an OR gate having first and second inputs and an output, the first input being connected to said output of said AND gate, and the second input being connected to said second output of said sync pulse source;

i. an amplifier-former having an input and an output and forming on its output the pulses used to simultaneously turn on said thyristors of the arrangement, said input being connected to said output of said OR gate, and said output being connected to said circuit applying narrow control pulses to each of said thyristors of said arrangement.

4. A system for pulsed control of a high-tension thyristor rectifying arrangement working as part of an n-phase converter and including a series connection of alternating thyristors and chokes and a circuit applying narrow control pulses to each of said thyristors, some of said thyristors are used as monitored thyristors or combined to form monitored thyristor groups so that the value of the positive voltage in the forward direction is measured on them, comprising:

a. a means for measuring the value of positive voltage in the forward direction on said arrangement, which means has an output;

b. devices for measuring said value of positive voltage in the forward direction on said monitored thyristors or said monitored thyristor groups, belonging to said voltage measuring means, said devices being connected to respective ones of said monitored thyristors or to respective ones of said monitored thyristor groups and forming monitor signals at the point in time when said value of positive voltage in the forward direction on each of said monitored thyristors or on each of said monitored thyristor groups exceeds a preset level, said devices having each an output;

c. an adder of said voltage measuring means connected to said outputs of said voltage measuring devices and forming a signal that carries data on the number of the received signals among said monitor signals, said adder having an output;

d. a reference signal source of said voltage measuring means forming an output signal representative of a given number of said monitor signals, said reference signal source having an output;

e. a comparison circuit comprising said output signals of said adder and said reference signal source and forming a narrow pulse at the point in time when said output signals of said adder and said reference signal source are of the same value, an output of said comparison circuit being used as said output of said voltage measuring means;

f. an AND gate having first, second and third inputs and an output, said first input being connected to said output of said comparison circuit;

g. a sync pulse source having a first output coupled to said second input of said AND gate, and a second output and forming at its first output a wide pulse whose length corresponds to the conduction interval of said arrangement and forming at its second output a narrow pulse at the beginning of the conduction interval of said arrangement;

h. a device for measuring the value of current flowing through said n-phase converter, forming the desired level of said current value and also forming a logic 0 signal when said current value exceed said desired level and a logic 1 signal when said current value is below said desired level, said device including an output connected to the third input of said AND gate;

i. an OR gate having first and second inputs and an output, the first input being connected to the output of said AND gate, and the second input being connected to the second output of said sync pulse source;

j. an amplifier-former having an input and an output and forming at its output pulses used to simultaneously turn on the thyristors of said arrangement, said input being connected to said output of said OR gate, and said output being connected to said circuit applying narrow control pulses to each of the thyristors of said arrangement.

* * * * *